United States Patent [19]
van der Lely

[11] 4,315,549
[45] Feb. 16, 1982

[54] SOIL WORKING MACHINE WITH INTERCONNECTED DISPLACEABLE SUPPORTS WHICH MAINTAIN ORIENTATION

[76] Inventor: Cornelis van der Lely, 7, Brüschenrain, Zug, Switzerland

[21] Appl. No.: 43,741

[22] Filed: May 30, 1979

[30] Foreign Application Priority Data

Jun. 5, 1978 [NL] Netherlands .......................... 7806076
Jun. 5, 1978 [NL] Netherlands .......................... 7806077

[51] Int. Cl.³ ............................................. A01B 15/00
[52] U.S. Cl. .................................... 172/657; 172/708
[58] Field of Search ............... 172/657, 658, 659, 660, 172/705, 707, 708, 709, 710

[56] References Cited

U.S. PATENT DOCUMENTS

2,379,779 7/1945 Ash ................................. 172/657 X
3,266,579 8/1966 Hofer ............................. 172/657 X
3,921,726 11/1975 Connor et al. ................... 172/707 X

FOREIGN PATENT DOCUMENTS

223716 6/1910 Fed. Rep. of Germany ...... 172/705
403288 9/1924 Fed. Rep. of Germany ...... 172/705
820344 11/1951 Fed. Rep. of Germany ...... 172/708

*Primary Examiner*—Richard T. Stouffer
*Attorney, Agent, or Firm*—William B. Mason

[57] ABSTRACT

A soil working machine comprises two interconnected soil working members. Each working member comprises a support that is preferably resilient and a lower working element. Deflection of one working member results in an opposite deflection of the other, but the orientation of the working elements is preferably maintained by a control arm. Levers pivoted to the frame and associated with the supports are interconnected by a rigid coupling. Alternatively, the supports can be attached to brackets which are pivoted to the frame and levers or parallelogram linkages interconnected to the brackets are connected by a rigid coupling.

11 Claims, 7 Drawing Figures

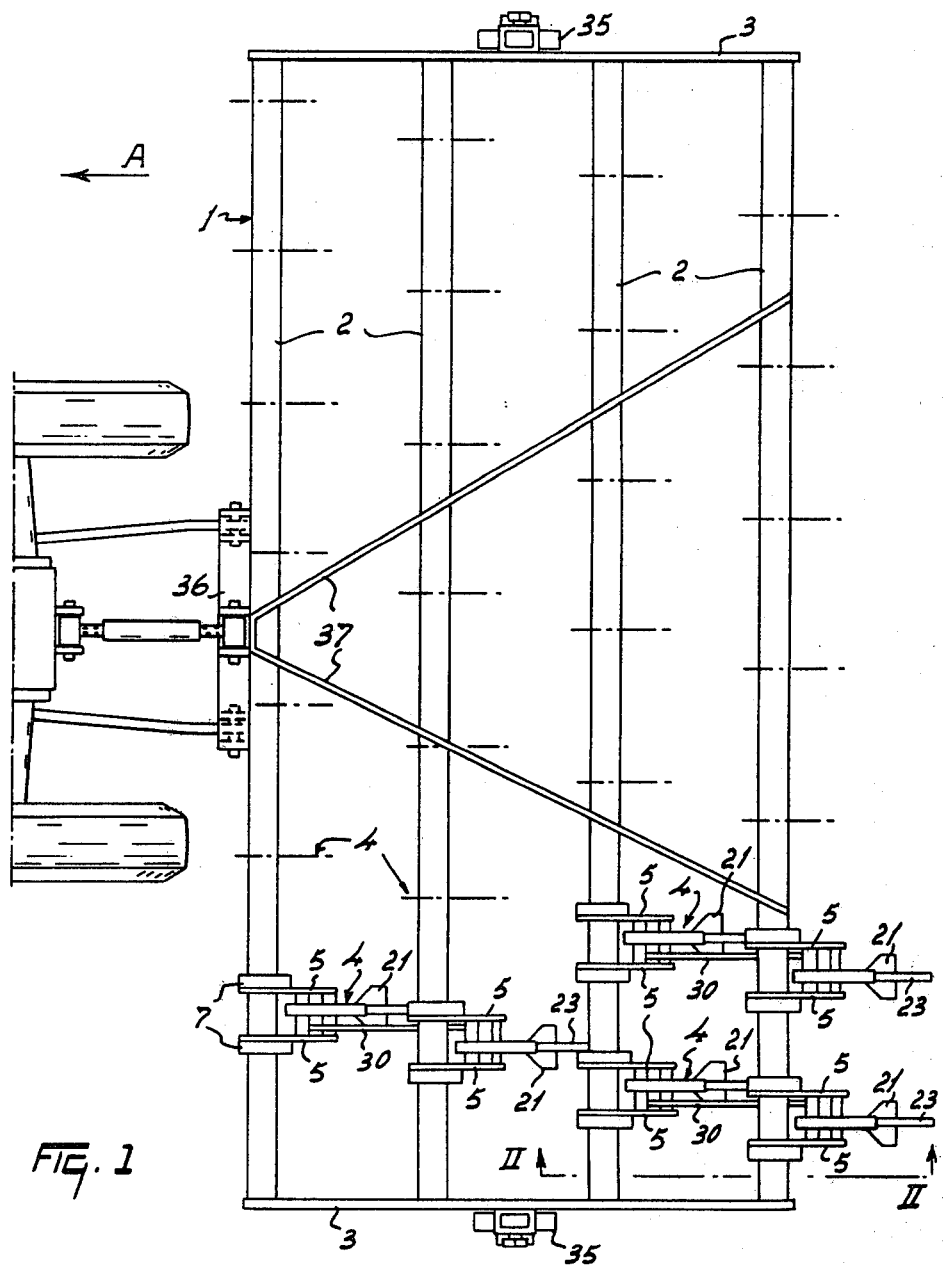

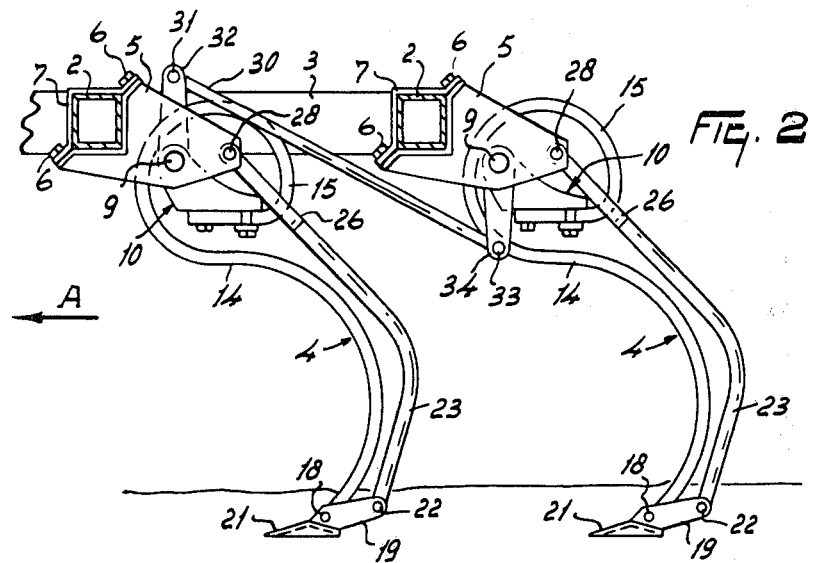
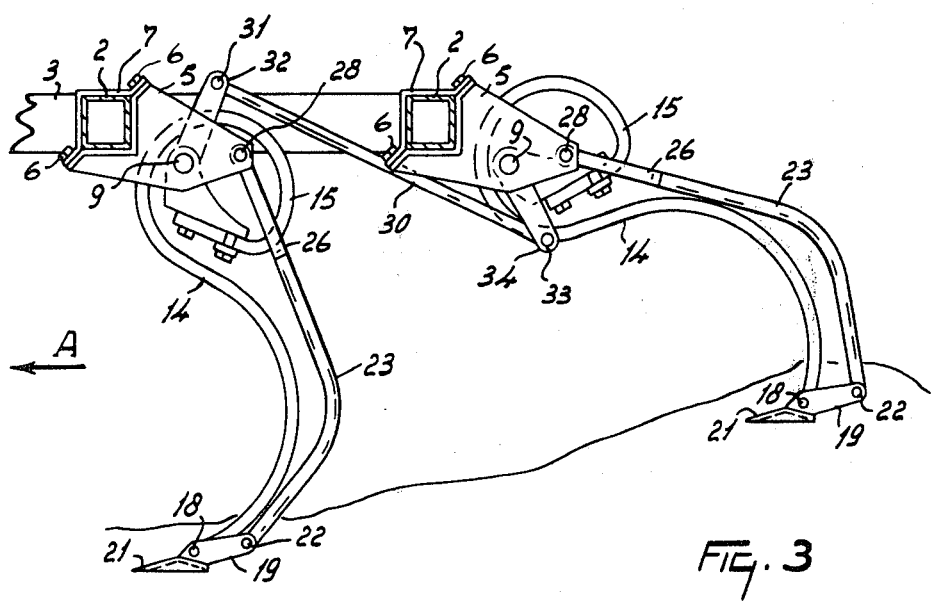

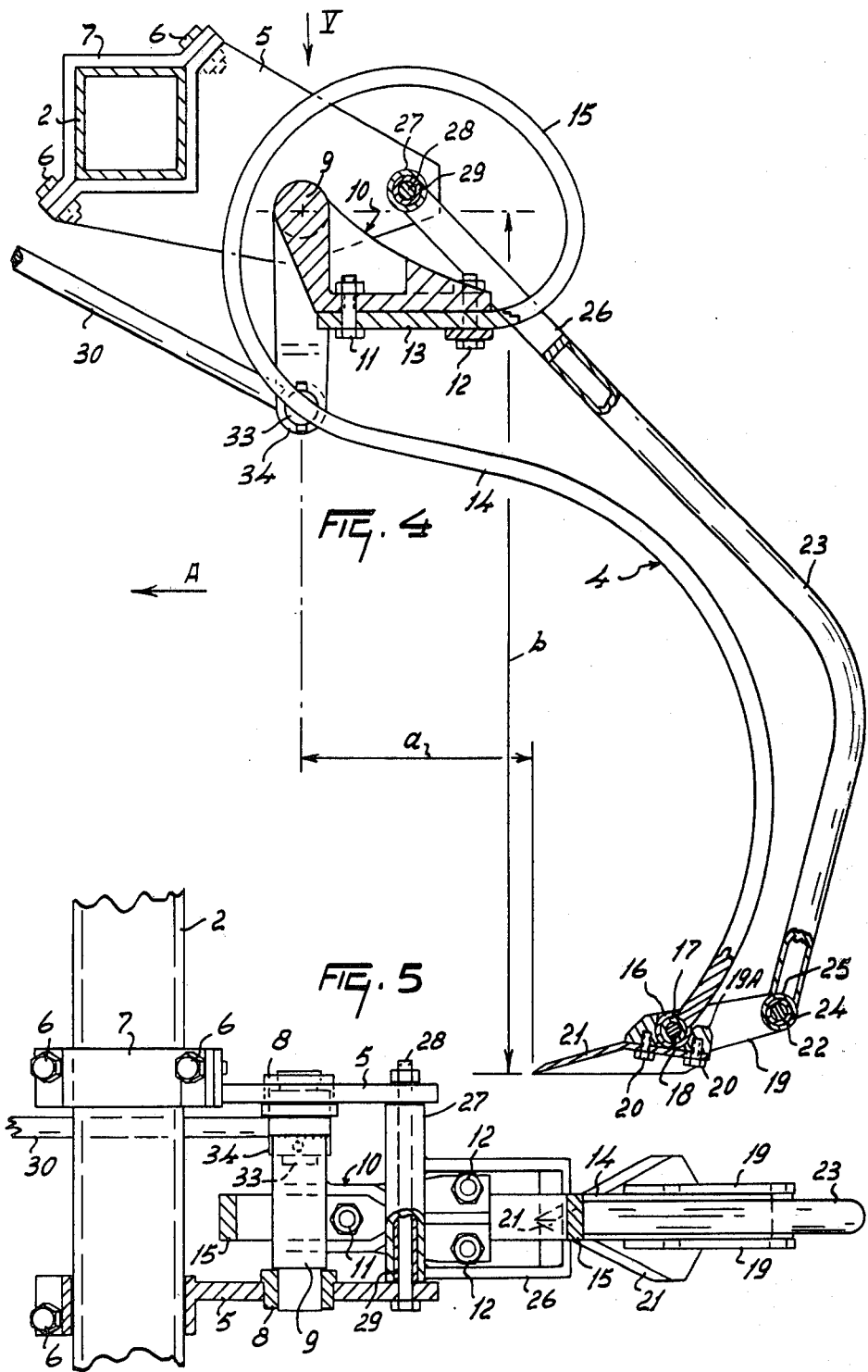

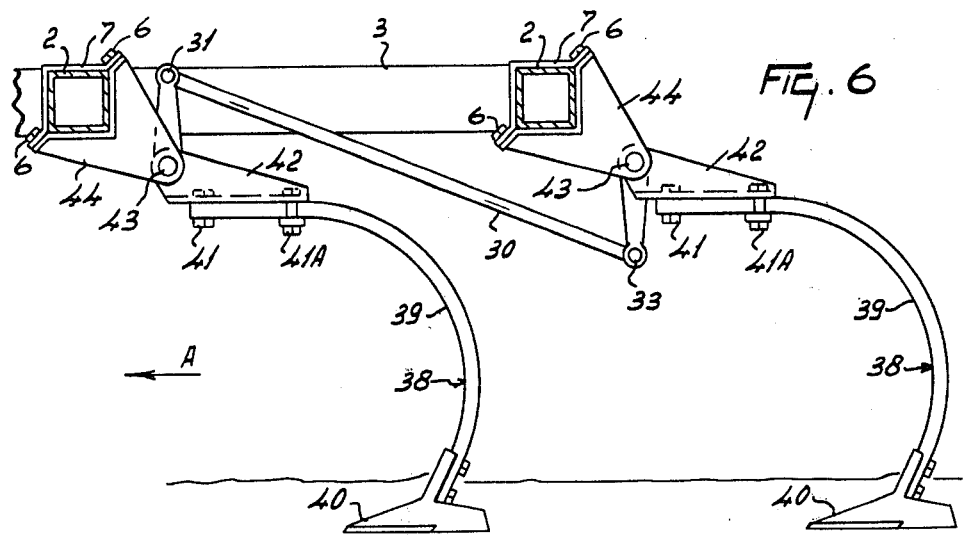
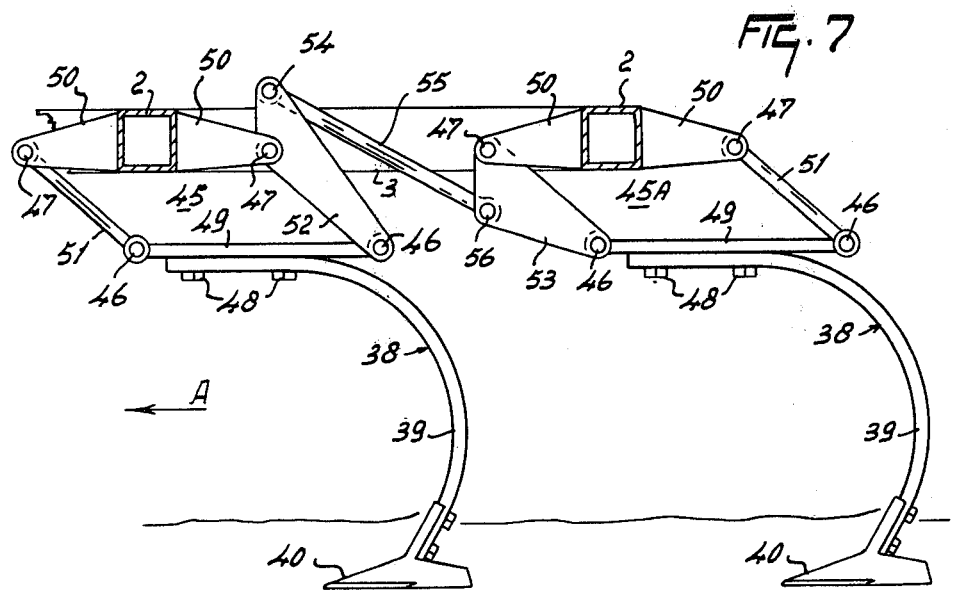

SOIL WORKING MACHINE WITH INTERCONNECTED DISPLACEABLE SUPPORTS WHICH MAINTAIN ORIENTATION

According to a first aspect of the present invention there is provided a soil working machine comprising a frame and at least two working members each comprising a support which is connected pivotally to the frame and is provided with a working element, the supports being interconnected by a coupling member, and means being provided for moving each of said two working elements relatively to its support to maintain substantially constant the orientation of each working element with respect to the frame when the respective support pivots relatively to the frame.

The interconnection of the working members allows them to deflect, in operation, away from obstacles in the soil, deflection of each working member producing a counterforce being resisted by the other to provide an effect which is comparable to that of a spring machine.

A construction in accordance with the first aspect of the present invention enables uniform soil working at a constant depth to be achieved. The working members move, during operation, about a mean working position under the action of the constantly varying forces exerted during the passage through the soil, while the working depth of the working members, once set, is automatically maintained and, moreover, upon deflection of the working members there is no change in orientation of the working elements which could disturb the prevailing equilibrium of forces and consequently could prevent the achievement of a constant working depth, particularly under extremely unfavourable soil conditions.

According to a second aspect of the present invention there is provided a soil working machine comprising a frame and at least two working members, each working member comprising a support which is pivoted to the frame in at least one replaceable bearing and is provided with a working element, the supports being interconnected by means of a coupling member.

According to a third aspect of the present invention there is provided a soil working machine comprising a frame and at least two working members, each working member comprising a support which is pivoted to the frame and is provided with a working element, the supports being interconnected by a coupling member and each being connected to the machine frame by a pivotable polygon linkage.

For a better understanding of the present invention and to show how it may be carried into effect, reference will now be made, by way of example only, to the accompanying drawings, in which:

FIG. 1 is a plan view of a soil working machine;

FIG. 2 is a view taken on the line II—II in FIG. 1;

FIG. 3 is a view corresponding to FIG. 2, under a different operative condition;

FIG. 4 is a view on an enlarged scale of part of the machine;

FIG. 5 is a view taken in the direction of the arrow V in FIG. 4;

FIG. 6 is a side view, corresponding to FIG. 2, of a second embodiment of a soil working machine; and FIG. 7 is a side view, corresponding to FIG. 2, of a third embodiment of a soil working machine.

The constructions illustrated in the Figures are soil working machines in the form of cultivators. As shown in FIG. 1, the cultivator comprises a frame 1 having four substantially horizontal, parallel frame beams 2 extending transversely of the intended direction A of operative travel of the machine and arranged at intervals one behind the other. The ends of the frame beams 2 are interconnected by tie strips 3 extending in the direction A. Each of the frame beams 2 is hollow and preferably has a square cross-section with two opposite sides of the beams being substantially horizontal. Each of the beams 2 is provided with a plurality of regularly spaced working members 4. The working members 4 on each beam 2 are off-set sideways from those on the other beams. The connection between each working member 4 and its beam 2 comprises a pair of spaced supporting plates 5, which project to the rear of the beam 2. Each supporting plate 5 is secured to the beam 2 by bolts 6 and a clamping piece 7 and is provided with replaceable bearing bushes 8 (FIG. 5), in which are supported the ends of a pivotal pin 9 extending transversely of the direction A; the pin 9 is thus pivotally arranged between the plates. The pivotal pin 9 is integral with a cast bracket 10, which has a flat bottom surface and is located behind the pin with respect to the direction A (FIG. 4). Bolts 11 and 12 secure a fastening portion 13 of a support 14 to the bottom of the bracket 10. The support 14 is made from resilient strip material. From the fastening portion 13 the support 14 extends in an S-shape, a portion 15 extending over and across the bracket 10 and passing between the plates 5. From the fastening portion 13 the portion 15 curves around a point located behind the pivotal pin 9 with respect to the direction A (FIG. 4). The lower end of the support 14 is provided with an eye 16 which is integral with the support and which receives a pivotal pin 18 in a nylon bearing 17. The pivotal pin 18 pivotally connects a carrier 19 to the lower end of the support 15. The carrier 19 is made from cast iron and beneath the pivotal connection with the carrier 14 it has a fastening surface on which is releasably secured by bolts 20 a working element 21 in the form of a triangular blade. From its pivotal connection with the support 14, the carrier 19 tapers rearwardly and is inclined upwardly from front to rear. The end of the carrier 19 is pivoted to the lower end of a tubular control arm 23 by means of a pivotal pin 22, which is parallel to the pivotal pin 18 and to the pivotal pin 9 for the support 14. The pin 22 is journalled in a nylon bearing 24 in a sleeve 25 at the lower end of the arm 23. The arm has a bend near its middle so that it substantially follows the shape of the support 14. The control arm 23 is hollow. The top of the control arm 23 is fastened to a fork 26, which is freely rotatable about a pivotal bolt 28 arranged between the rear ends of the plates 5, the fork 26 having a sleeve 27 which surrounds the bolt 28. There is a nylon bearing 29 between the bolt 26 and the sleeve 27. As can be seen in FIG. 5, the limbs of the fork 26 are located one on each side of the support 14.

The working members 4 arranged on the front and the second frame beams 2 and those on the third and fourth frame beams 2 are interconnected so that turning of one working member results in the other working member turning in the opposite direction (FIGS. 2 and 3). The pivotal connection between the working members 4 on the adjacent beams 2 includes a rigid coupling rod 30, the leading end of which is pivoted by means of a pin 31 to the top end of a lever 32, which is located to one side of the bracket 10 and extends upwards from the pivotal pin 9. The trailing end of the coupling rod 30 is pivoted by means of a pin 33 to the lower end of a lever 34, which extends downwards from its connection with the pivotal pin 9 about which the trailing support 14 pivots.

Each of the tie strips 3 is provided with a ground wheel 35, which is vertically adjustable. Near its middle, the front frame beam 2 is provided with a trestle 36 for hitching the machine to the three-point lifting device of a tractor. The top of the trestle 36 is connected with the rear frame beam 2 by diverging supports 37.

During operation the frame 1 of the machine is coupled by the trestle 36 with the three-point lift of a tractor and the machine is run in the direction A. The working elements 21 of the respective working members 4 then move at a given depth, for example the stubble depth, across the soil to loosen weeds and stubble. The position of the intercoupled working members in normal operation on even ground is illustrated in FIG. 2, which position may be considered to be a mean working position about which the working members move under the action of constantly varying forces applied by the soil. The forces on the two interconnected working members are equalized through the coupling rod 30 and the levers 32 and 34. From FIG. 2 it will be appreciated that the levers 32 and 34 are substantially vertical in the mean working position. The equalization of forces between the interconnected working members ensures that a constant working depth is automatically maintained.

If, as is illustrated schematically in FIG. 3, the leading working member moves into a depression in the ground and thus tends to work at a smaller depth, the force exerted on the tine decreases. The trailing working member will exert a force on the leading working member through the coupling rod 30 such that the leading working member will move more deeply into the soil to maintain its normal working depth. As the leading working member moves deeper into the soil, it will transmit a higher force through the rod 30 so that eventually the trailing working member, when it arrives at the depression will also work at a greater depth.

From the position shown in FIG. 2 the levers 32 and 34 can deflect to both sides through about 45°. When one of the supports 14 turns to the rear about the pivotal axis constituted by the longitudinal centerline of the pivotal pin 9, the control arm 23 turns the carrier 19 with respect to the support 14 to an extent such that the orientation of the carrier 19 and hence the orientation of the working element 21 with respect to the frame 1 and to the ground are maintained. With this arrangement, the position of the working elements cannot adversely affect the abovementioned play of forces, as could happen, for example, if one of the supports were deflected to bring its working element into an orientation quite different from that of the other working element. Each working element 21 is essentially supported by means of a pivotable polygon having four pivotal points constituted by the longitudinal centerlines of the pivotal pins 9, 18, 22 and 28. From FIG. 4 it can be seen that these pivotal axes occupy positions substantially at the corners of a pivotable parallelogram. Excessive upwards movement of the carrier 19 is prevented by a stop 19A, which can co-operate with the rear side of the support 14.

From FIGS. 2 and 4 it can be seen that the pivotal axis for the support of each working member is located, with respect to the direction A, a distance a in front of the working element. This distance a is about one quarter of the vertical distance b between the axis of the support and the working element. The specific location of the pivotal axis constituted by the longitudinal centerline of the pivotal pin 9 provides in operation the most favourable mean work position for the working member with regard to the above-mentioned equalization of forces (central position). Since each support 14 is made from resilient material, the working elements have some flexibility which is conducive to the uniformity of cultivation.

In this embodiment shown in FIG. 6 the working members 38 have a support 39 of rigid material which extends forwardly in a regular curve away from its lower end. The lower end of the support has a working element 40 in the form of a blade. At the top the support 39 has a fastening portion which extends in the direction A and is connected by bolts 41 and 41A to a bracket 42. The bracket 42 is pivotally connected by a transverse pivotal pin 43 between a pair of plates 44 arranged on the respective frame beam 2. As in the previous embodiment there is a coupling rod 30 between two consecutive working members so that, during operation, the abovementioned play of forces occurs to achieve automatically a constant working depth of the working members. In this embodiment, the same means for maintaining the orientation of the working elements may be used as in the preceding embodiment, but this means is not shown in FIG. 6.

FIG. 7 shows an embodiment in which different means are provided for the maintaining the orientation of the working elements 40, the working members 38 being the same as in FIG. 6. These means comprise a parallelogram construction 45, 45A, by which the supports 39 are arranged on their frame beams. Each parallelogram construction 45, 45A comprises two pivotal pins 46 located near the top of the support 39 and two pivotal pins 47 located at the level of the respective frame beam 2. The pivotal pins 46 are located at the ends of a horizontal member 49 which extends in the direction A and is connected to the support 39 by bolts 48. The pivotal pins 47 are located one in front of and one behind the frame beam 2 on support arms 50. The two front pivotal pins 46 and 47 of the parallelogram 45 for the leading working member and the two rear pivotal/pins 46 and 47 of the parallelogram 45A for the trailing working member are interconnected by means of links 51. The two rear pivotal pins 46 and 47 of the parallelogram 45 are interconnected by a lever 52 and the two front pivotal pins 46 and 47 of the parallelogram 45A are interconnected by a lever 53. The lever 52 extends upwardly beyond the pin 47 and is pivotally connected to a rigid coupling rod 55 by a pivotal pin 54. In the mean working position of the working member 38, the pivotal pin 54 is vertically above the pivotal pin 47. The rear end of the coupling rod 55 is pivoted by means of a pivotal pin 56 to the lever 53 at a location which is between the pins 46 and 47 and is vertically beneath the pin 47 in the mean working position. With respect to the direction A, the pins 46 are behind the pins 47.

In this embodiment the parallelogram structures 45 and 45A ensure that, upon deflection of the respective working members, the orientation of the working elements in the ground does not change significantly, while, as in the preceding embodiments, the connection between the two parallelograms by means of the coupling rod 55 means that the aforesaid equalization of forces of the two consecutive working members is obtained.

While various features of the machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil working machine comprising a frame and at least two soil working members supported on said frame, said members being positioned one behind the other with respect to the direction of travel, each member comprising a leading resiliently mounted support having an upper fastening portion bent through at least 180° and said fastening portion being interconnected to said frame by pivot means, a rigid control-arm having an upper portion pivoted to the frame, said arm being located to the rear of said pivot means, said support and arm extending downwardly to respective pivots to a soil working element, the upper portion of said control arm figuratively being at least partly surrounded by the fastening portion bend of said support in side view, the supports of the two members being interconnected by a rigid coupling, whereby one support is displaced responsive to the movements of the other support and the respective soil working elements of said members maintain soil working orientation.

2. A soil working machine as claimed in claim 1, in which said element is mounted on a carrier with releaseable fastening means and said carrier extends substantially horizontally.

3. A soil working machine as claimed in claim 1, in which said fastening portion is mounted on a bracket and the latter is pivotably supported between two support members on said frame by a transverse shaft.

4. A soil working machine as claimed in claim 3, in which the upper portion of said control arm is connected to a fork which is pivotally mounted on a pin between the support members, the limbs of said fork being positioned one on each side of the upper portion of said support which extends between said support members.

5. A soil working machine as claimed in claim 4, in which said pin of the fork is mounted in bearings held by the support members.

6. A soil working machine comprising a frame and at least two soil working members supported on said frame, said members being positioned one behind the other with respect to the direction of travel, each member comprising a leading support having an upper resilient fastening portion bent through at least 180° and said fastening portion being interconnected to said frame by pivot means, a rigid control-arm having an upper portion pivoted to the frame, said arm being located to the rear of said pivot means, said support and arm extending downwardly to respective pivots to a soil working element, the pivot connections of the support and control arm to the frame and to the soil working element defining a quadrilateral linkage, the supports of said two members being interconnected by a rigid coupling, whereby one support is displaced responsive to the movements of the other support and the respective soil working elements of said members maintain soil working orientation.

7. A soil working machine as claimed in claim 6, in which pivotal axes of said linkage extend transverse to the direction of travel.

8. A soil working machine as claimed in claim 7, in which said coupling comprises a rigid coupling rod pivoted to levers on brackets and said brackets pivotably interconnect respective supports to the frame.

9. A soil working machine as claimed in claim 6, in which said fastening portion is connected to said frame through a bracket and said bracket is pivotable about a transverse axis with respect to said frame, said fastening portion extending from said shaft in the shape of an S to curve rearwardly over said bracket and substantially surround said axis.

10. A soil working machine as claimed in claim 9, in which said bracket is pivotally mounted between two spaced apart plates of said frame, part of said support fastening portion curving rearwardly over said bracket and being located between said plates.

11. A soil working machine as claimed in claim 9, in which the center of rear curvature is located behind the pivotal axis of said bracket.

* * * * *